(12) United States Patent
Selle et al.

(10) Patent No.: US 8,672,597 B2
(45) Date of Patent: Mar. 18, 2014

(54) FASTENER

(75) Inventors: Stephen Selle, Mentor, OH (US); Jonathan Wayne Dieter, Painesville, OH (US)

(73) Assignee: Stafast Products, Inc., Painesville, OH (US)

( * ) Notice: Subject to any disclaimer, the term of this patent is extended or adjusted under 35 U.S.C. 154(b) by 1927 days.

(21) Appl. No.: 11/673,525

(22) Filed: Feb. 9, 2007

(65) Prior Publication Data

US 2008/0193254 A1    Aug. 14, 2008

(51) Int. Cl.
*F16B 37/06*    (2006.01)

(52) U.S. Cl.
CPC .................................. *F16B 37/065* (2013.01)
USPC ........................................................ 411/181

(58) Field of Classification Search
USPC ............................ 411/180, 181, 187, 188, 303
See application file for complete search history.

(56) References Cited

U.S. PATENT DOCUMENTS

| | | | |
|---|---|---|---|
| 180,064 A | 7/1876 | Rebasz | |
| 244,379 A | 7/1881 | Coulter et al. | |
| 397,988 A | 2/1889 | Kimball | |
| 797,545 A | 8/1905 | Reed | |
| 812,294 A | 2/1906 | Ette | |
| 1,112,525 A * | 10/1914 | Darling | 248/187.1 |
| 1,773,146 A | 8/1930 | Kellogg | |
| 1,881,836 A | 10/1932 | Mitchell | |
| 1,893,067 A | 1/1933 | Arenz | |
| 1,919,728 A | 7/1933 | Kellogg | |
| 2,026,757 A * | 1/1936 | Swanstrom | 411/180 |
| 2,049,104 A | 7/1936 | Charlton | |
| 2,321,497 A | 8/1939 | Luce | |
| 2,208,779 A | 7/1940 | Tinnerman | |
| 2,267,379 A | 12/1941 | Tinnerman | |
| 2,314,756 A | 3/1943 | Bedford, Jr. | |
| 2,343,947 A | 3/1944 | Auslander | |
| 2,381,936 A | 8/1945 | Sargent | |
| 2,383,141 A | 8/1945 | Maage | |
| 2,477,430 A | 7/1949 | Swanstrom | |
| 2,685,721 A | 8/1954 | Eves | |
| 2,936,668 A | 5/1960 | Meyer | |
| 2,968,206 A | 1/1961 | Bunnosuke | |
| 3,004,784 A | 10/1961 | Selby | |
| 3,037,596 A | 6/1962 | Fordyce | |

(Continued)

OTHER PUBLICATIONS

U.S. Appl. No. 11/673,059, Selle.

(Continued)

*Primary Examiner* — Flemming Saether
(74) *Attorney, Agent, or Firm* — Woodling, Krost and Rust

(57) ABSTRACT

A fastener in combination with a substrate wherein the fastener is affixed to the substrate in a manner that does not damage the substrate. The fastener comprises a barrel having an interior, an exterior, a first end portion, a second end portion, and an intermediate portion. The first end portion of the barrel includes a flange. The exterior of the barrel proximate the flange includes a gripping portion with a spline having at least 12 teeth. The interior of the barrel proximate the second end portion of the barrel includes a counterbore. The interior of the barrel proximate the intermediate portion is threaded. The second end portion of the barrel is flared. The substrate includes a cylindrically shaped bore extending therethrough. The barrel of the fastener partially resides in the bore of the substrate and the 12-toothed spline on the exterior of the barrel of the fastener engages the bore of the substrate and surrounding material with minimal deformation.

3 Claims, 11 Drawing Sheets

(56) References Cited

U.S. PATENT DOCUMENTS

| | | |
|---|---|---|
| 3,050,097 A | 8/1962 | Cochran |
| 3,146,656 A | 9/1964 | Richards |
| 3,234,612 A | 2/1966 | Raymond |
| 3,235,917 A | 2/1966 | Skubic |
| 3,270,610 A | 9/1966 | Knowlton |
| 3,289,724 A | 12/1966 | Ernest |
| 3,319,509 A | 5/1967 | Constantino |
| 3,353,580 A | 11/1967 | Benjamin |
| 3,358,727 A | 12/1967 | Hughes |
| 3,403,218 A | 9/1968 | Norden |
| 3,461,936 A * | 8/1969 | Rosan, Sr. ............... 411/180 |
| 3,505,636 A | 4/1970 | McDowell |
| 3,646,982 A | 3/1972 | Cushman |
| 3,704,507 A | 12/1972 | Grube |
| 3,809,139 A | 5/1974 | Strain |
| 3,845,860 A | 11/1974 | Ladouceur et al. |
| 3,878,599 A | 4/1975 | Ladouceur et al. |
| 3,920,059 A | 11/1975 | Grube |
| 3,926,236 A | 12/1975 | Pouch et al. |
| 3,962,828 A | 6/1976 | McAllister |
| 3,967,412 A | 7/1976 | Governale |
| 4,018,257 A * | 4/1977 | Jack ............... 411/181 |
| 4,074,464 A | 2/1978 | McCay |
| 4,172,523 A | 10/1979 | Weglage |
| 4,279,341 A | 7/1981 | Pleickhardt |
| 4,306,654 A | 12/1981 | Grube |
| 4,352,258 A | 10/1982 | Bursk |
| 4,376,334 A | 3/1983 | Miller |
| 4,377,360 A | 3/1983 | Kennedy |
| 4,379,537 A | 4/1983 | Perrault et al. |
| 4,387,535 A | 6/1983 | Corbo |
| 4,447,987 A | 5/1984 | Lesosky |
| 4,476,653 A | 10/1984 | Speer |
| 4,508,478 A | 4/1985 | Leistner |
| 4,580,322 A | 4/1986 | Wright |
| 4,595,325 A | 6/1986 | Moran |
| 4,768,907 A | 9/1988 | Gauron |
| 4,770,275 A | 9/1988 | Williams |
| 4,790,701 A | 12/1988 | Baubles |
| 4,860,513 A | 8/1989 | Whitman |
| 4,903,831 A | 2/1990 | Francis |
| 4,913,609 A | 4/1990 | Mauer |
| 4,945,680 A | 8/1990 | Giguere |
| 4,961,553 A | 10/1990 | Todd |
| 4,971,499 A | 11/1990 | Ladouceur |
| 4,991,365 A | 2/1991 | Jackson |
| 5,010,690 A | 4/1991 | Geoffrey |
| 5,078,537 A | 1/1992 | Nomura |
| 5,096,350 A | 3/1992 | Peterson |
| 5,108,238 A | 4/1992 | Ewing |
| 5,114,014 A | 5/1992 | Ascalon et al. |
| 5,136,814 A | 8/1992 | Headrick |
| 5,138,814 A | 8/1992 | Giles et al. |
| 5,152,582 A | 10/1992 | Magnuson |
| 5,179,804 A | 1/1993 | Young |
| 5,195,854 A | 3/1993 | Nagayama |
| 5,199,836 A | 4/1993 | Gogarty |
| 5,214,843 A | 6/1993 | Bromley et al. |
| 5,230,181 A | 7/1993 | Geoffrey |
| 5,238,344 A | 8/1993 | Nagayama |
| 5,244,326 A * | 9/1993 | Henriksen ............... 411/180 |
| 5,273,351 A | 12/1993 | Rubel |
| 5,297,851 A | 3/1994 | Van Hekken |
| 5,299,686 A | 4/1994 | Bromley et al. |
| 5,314,427 A | 5/1994 | Goble et al. |
| 5,327,645 A | 7/1994 | Bromley et al. |
| 5,348,432 A | 9/1994 | Nagayama |
| 5,388,940 A | 2/1995 | Herren |
| 5,391,031 A | 2/1995 | Medal |
| 5,423,645 A * | 6/1995 | Muller et al. ............... 411/181 |
| 5,426,894 A | 6/1995 | Headrick |
| 5,429,466 A | 7/1995 | Nagayama |
| 5,445,483 A * | 8/1995 | Fultz ............... 411/181 |
| 5,489,173 A | 2/1996 | Hofle |
| 5,501,558 A | 3/1996 | Figge |
| 5,503,596 A | 4/1996 | Nagayama |
| 5,517,788 A | 5/1996 | McGough |
| 5,524,391 A | 6/1996 | Joffe |
| 5,564,873 A * | 10/1996 | Ladouceur et al. ............... 411/180 |
| 5,588,266 A | 12/1996 | Headrick |
| 5,611,173 A | 3/1997 | Headrick |
| 5,618,144 A | 4/1997 | Leistner |
| 5,624,217 A | 4/1997 | Hungerford |
| 5,638,641 A | 6/1997 | Joffe et al. |
| 5,722,131 A | 3/1998 | Leistner |
| 5,762,190 A | 6/1998 | Leistner |
| 5,863,164 A | 1/1999 | Leistner |
| 5,879,119 A * | 3/1999 | Robinson ............... 411/399 |
| 5,893,538 A | 4/1999 | Onishi et al. |
| 5,904,461 A * | 5/1999 | McKarge, Jr. ............... 411/302 |
| 5,918,738 A | 7/1999 | Leistner |
| 5,993,320 A | 11/1999 | Selle |
| 6,071,052 A | 6/2000 | Kerr |
| 6,095,738 A | 8/2000 | Selle |
| 6,109,849 A * | 8/2000 | Nagayama ............... 411/181 |
| 6,129,431 A | 10/2000 | Hansen, Jr. et al. |
| 6,129,493 A | 10/2000 | Leistner |
| 6,131,347 A | 10/2000 | Hornberger et al. |
| 6,174,117 B1 | 1/2001 | Kawatani et al. |
| 6,183,181 B1 | 2/2001 | Leistner |
| 6,185,870 B1 | 2/2001 | Mettler |
| 6,203,231 B1 | 3/2001 | Salice |
| 6,209,722 B1 | 4/2001 | Leistner |
| 6,272,814 B1 | 8/2001 | Ikuta et al. |
| 6,305,888 B1 | 10/2001 | Leistner |
| 6,345,477 B1 | 2/2002 | Kepler et al. |
| 6,349,907 B1 | 2/2002 | Hollington et al. |
| 6,407,351 B1 | 6/2002 | Meyer |
| 6,637,994 B2 * | 10/2003 | Leistner ............... 411/181 |
| 6,640,968 B2 | 11/2003 | Selle |
| 6,701,570 B2 | 3/2004 | Henriott et al. |
| 6,832,696 B2 | 12/2004 | Donner |
| 6,854,943 B2 * | 2/2005 | Nagayama ............... 411/429 |
| 7,021,221 B2 | 4/2006 | Del Frari |
| 7,287,732 B2 | 10/2007 | Balistreri |
| 7,427,180 B2 | 9/2008 | Ladoucer et al. |
| 7,484,700 B2 | 2/2009 | Selle |
| 7,524,129 B2 | 4/2009 | Selle |
| 2003/0035700 A1 * | 2/2003 | Chiang ............... 411/303 |
| 2004/0234356 A1 | 11/2004 | Parker et al. |
| 2005/0232724 A1 | 10/2005 | Selle |
| 2008/0069660 A1 | 3/2008 | Selle |
| 2008/0193254 A1 | 8/2008 | Selle |

OTHER PUBLICATIONS

U.S. Appl. No. 11/523,446, Selle.
U.S. Appl. No. 11/444,729, Selle.

\* cited by examiner

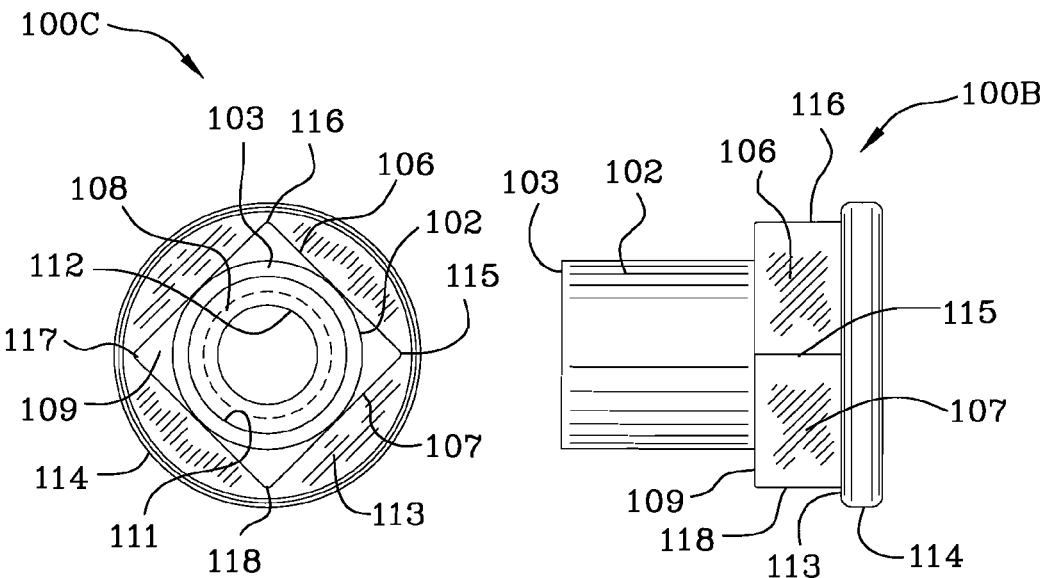
FIG. 1C
(PRIOR ART)
FIG. 1B
(PRIOR ART)
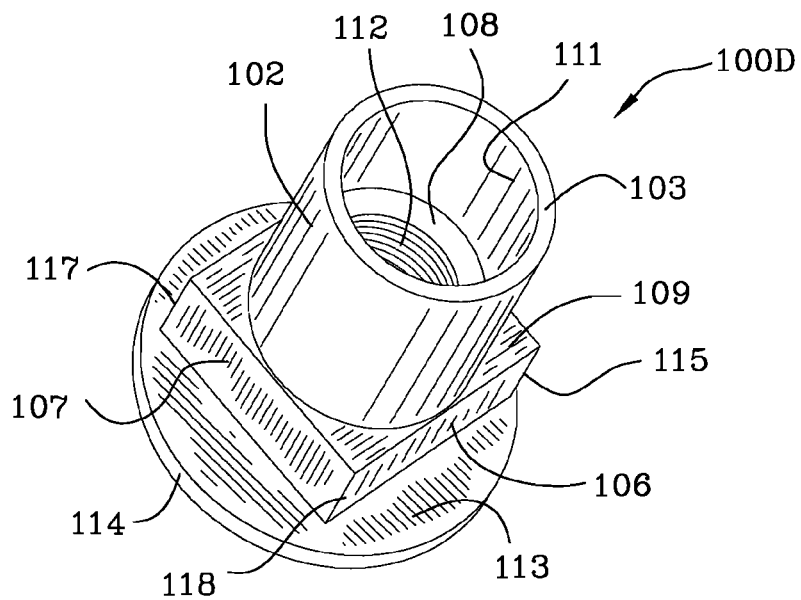
FIG. 1D (PRIOR ART)

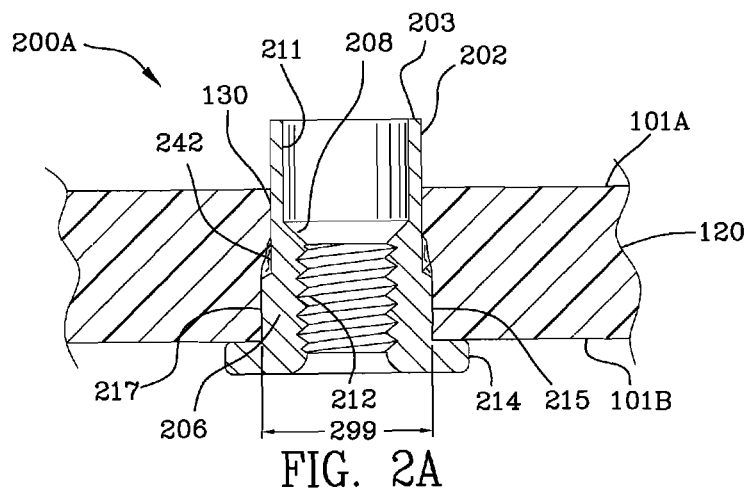
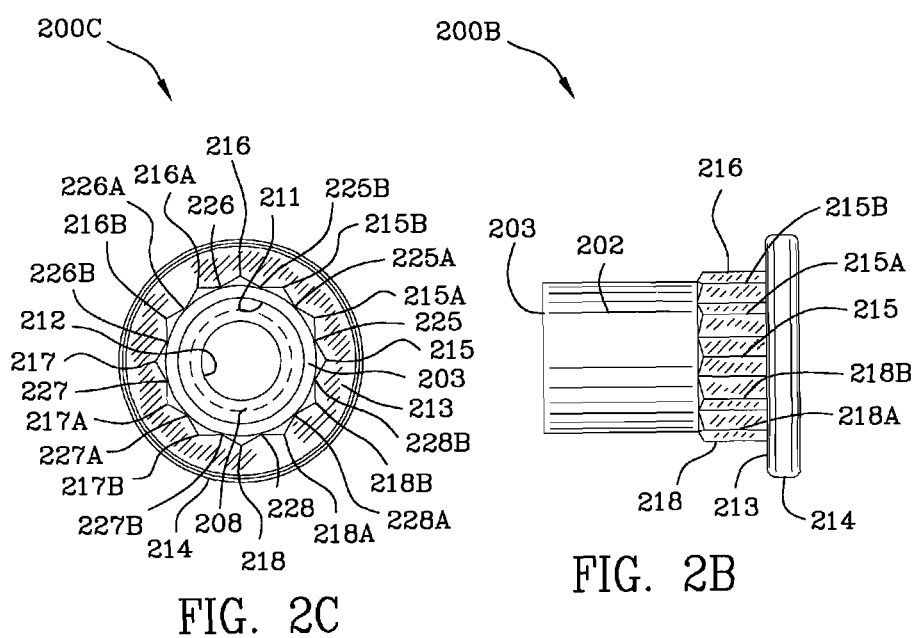

FASTENER

FIELD OF THE INVENTION

The invention is in the field of fasteners which are mounted in a substrate such as plastic or wood.

BACKGROUND OF THE INVENTION

U.S. Pat. No. 6,866,769 illustrates a stud having a 12 point drive head and a flange made from a less malleable metal such as a powder metal nickel alloy.

U.S. Pat. No. 4,625,260, FIGS. 11-14, illustrate fasteners which utilize threaded studs with flanges and a knurled or serrated base portion adjacent the flange which is force-fitted or swaged into a hole in a mounting for heat dissipation purposes. See, column 5, lines 46 to col. 6, line 57.

FIG. 1 is a perspective view 100 of the prior art 4-tooth automation nut (fastener) inserted into and through the surface 101A of the plastic substrate 120. The device is referred to as an automation nut. FIG. 1 illustrates the barrel 102 of the prior art fastener protruding through the substrate 120. A counterbore 111 within the barrel 102 is shown proximate the second end 103 of the fastener. Shards 104 are caused by teeth of the fastener jammed forcefully into the substrate and project upwardly in proximity to the barrel 102. Protrusions 105 project upwardly from the surface 101A of the substrate 120 and are often discolored. The substrate may be plastic, wood, hard or soft plywood or pressboard. Nominally, the substrate thickness is 0.1875 to 1 inch. However, any size substrate may be used.

FIG. 1A is a cross-sectional view 100A taken along the line 1A-1A of FIG. 1 illustrating the prior art automation nut inserted into a plastic substrate 120. Internal threads 112 and flange 114 are illustrated in this view. Shards 104 extend upwardly as viewed in FIG. 1A above teeth 115, 117. Still referring to FIG. 1A, the upper surface 109 of the outer gripping portion 106 deforms the plastic above surface 109 as indicated by reference numeral 142. Reference numeral 141 represents distortion in proximity to the teeth 115, 117. Distortion of the plastic substrate along the fastener is illustrated by reference numerals 141 and 142. Protrusions 105 occur as illustrated in FIG. 1A along with attendant discolorations in the plastic substrate 120. The lower surface 101B of substrate 120 is illustrated in FIG. 1A.

The fastener of FIGS. 1 and 1A is secured to a substrate and then another device such as a bolt having external threads mates with the internal threads 112 for locking securement. Several methods of locking the externally threaded stud may be used. For example, nylon locking rings, metal locking rings, and deformation of the threads may be employed to insure that the fastener connection does not become loose.

FIG. 1B is a side view 100B of the prior art automation nut illustrating the flange 114 and teeth 115, 116 and 118 of the gripping portion 106. The height of the gripping portion 106 is also illustrated in FIG. 1B and is nominally 0.17 inches above the flange 114. The flange 114 is nominally 0.08 inches thick and the overall length or height of the automation nut is 0.625 inches. FIG. 1C is an end view 100C of the prior art automation nut and the teeth 115-118 are readily viewed. Further, FIG. 1C indicates a relatively large surface 109 of the gripping portion 106 and it is that surface which engages the substrate as the automation nut is forcefully shoved into the substrate. Referring to FIG. 1C, the distance between the outermost portions of teeth 115 and 117 is nominally 0.52 inches.

FIG. 1D is a perspective view 100D of the prior art automation nut illustrating the sharp squared teeth 115, 118, and 117 of the nut. Again, the surface area 109 of the gripping portion 106 is viewed well in FIG. 1D.

FIG. 1E is a perspective view 100E of the prior art automation nut shown positioned for insertion into the bore 130 of the plastic substrate 120. The bore is nominally 0.375 inches in diameter and the outside diameter of the barrel 111 is nominally 0.371 inches so that it may slidingly fit within the bore 130. Bore 131 in wood is the same diameter as bore 130. Essentially, the automation nut and its generally square-shaped gripping portion 106 are force-fitted along the arrow labeled F into a round hole or cylinder 130. Since the square-shaped gripping portion 106 of the automation nut is substantially differently shaped than its cylindrically-shaped bore 130 and since the distance from the apex of tooth 115 to the apex of tooth 117 is 0.52 inches, deformation of the plastic substrate 120 occurs. FIG. 1E represents the state before the automation nut is force fit into the bore and FIGS. 1 and 1A represent the result of force fitting the automation nut into the bore 130.

FIG. 1F is an enlarged view 100F of the prior art automation nut similar to FIG. 1 with the barrel flared to form a lip 111A thus securing the automation nut to the plastic substrate 120. It will be noticed that the flared barrel is somewhat distorted and non-symmetrical due to folding the lip 111A over the shards 104 and the protrusions 105. When the barrel 102 is flared the protrusions and shards prevent the barrel from folding smoothly and uniformly with respect to the bore 130 through the substrate 120.

FIG. 1G is a cross-sectional view 100G taken along the lines 1G-1G of FIG. 1F. A gap 150 between the surface 101A and the lip 111A is illustrated in FIG. 1G. Deformation of the plastic substrate 120 is caused by forcing the surface 109 and the teeth 115, 117 of the gripping portion 106 of the automation nut into the bore 130 of the substrate. Bore 130 has a diameter (0.375 inches) slightly larger than the outside diameter of the barrel 102 (0.371 inches) but substantially smaller than the distance between the teeth 115 and 117 (0.52 inches). Thus, as the automation nut is forced into the bore 130 the surface 109 above teeth 115, 117 engage and deform the plastic substrate 120 as indicated by reference numerals 141, 142. See FIG. 1H, a cross-sectional view 100H of the bore 130 through the plastic substrate prior to insertion of the prior art automation nut therein.

FIG. 1I is a cross-sectional view 100I similar to FIG. 1G illustrating a barrel flared over deformed portions 141A, 142A of a wooden substrate 121. The deformed portions include splinters and broken wood fibers. Substrate 121 may be pressboard or particle board or it may be virgin wood. FIG. 1J is a cross-sectional view 110J of the bore through the wooden substrate 121 prior to insertion of the prior art automation nut therein.

FIG. 1K is a perspective view 100K of another prior art automation nut wherein the gripping portion 160 does not project very far from surface 113 of the flange 114 nor does barrel 162 extend upwardly very far as compared to the example illustrated in FIGS. 1B-D. One of the problems with the prior art is that the gripping portion having 4 teeth is difficult to manufacture using the cold headed process. The gripping portion 160 with 4 teeth, due to cold heading manufacturing problems, results in beveled teeth 161, 165, and 166. This is especially true when an automation nut as shown by way of example in FIG. 1K is manufactured for insertion into a relatively thin substrate. It is believed that the beveled edges of the teeth reduce the gripping ability resulting in a lower torque spin out.

SUMMARY OF THE INVENTION

A fastener in combination with a substrate is disclosed and claimed. The fastener is commonly referred to as an automation nut and it may be used in various applications including the manufacture of a boat and in the manufacture of furniture. The fastener comprises a barrel and the barrel includes an interior, an exterior, a first end portion, a second end portion, and an intermediate portion. The first end portion of the barrel includes a flange. The exterior of the barrel proximate (near) the flange includes a gripping portion with a spline having 6-12 teeth. Sometimes herein the feature of the gripping portion having 12 teeth is described as a 12-pointed exterior or a 12-pointed automation nut. The interior of the barrel proximate the second end portion of the barrel includes a counterbore terminating in a shoulder. The interior of the barrel proximate the intermediate portion is threaded and the second end portion of the barrel is flared. The substrate comprises a first surface, a second surface and an intermediate portion. A cylindrically shaped bore extends through the surfaces and the intermediate portion of the substrate. The barrel of the fastener partially resides in the bore of the substrate. The 12-toothed spline on the exterior of the gripping portion of the fastener engages the bore of the substrate and material outside of the bore of the substrate. The bore of the substrate is minimally deformed proximate the 12-toothed spline. The flange of the fastener engages the first surface of the substrate. The flared portion of the barrel engages the second surface of the substrate.

The cold-headed fastener disclosed herein includes a barrel shape which provides high resistance to spin-out torque. In particular, the example wherein the barrel includes 12 convex teeth has been found to provide high resistance to spin-out torque.

The cold-headed fastener disclosed herein includes a counterbored barrel for riveting the barrel and creates retention against pull-out force, and also has the option of a locking mechanism. The locking mechanism may be a mechanical crimp, spring steel locking ring, nylon lock ring, or other style lock. The fastener may be used in wood, particle board, plywood, various plastics and in other materials.

The fastener includes a round base flange which may assume various diameters and a cylindrical barrel which may assume various lengths. Proximate the flange is a gripping portion formed as a spline which has a plurality of teeth. The number of teeth of the spline may be anywhere from 6 to 12 or even higher than 12. It is specifically contemplated that other examples may include more than 12 teeth. Additionally, it is specifically contemplated that the geometry of the teeth may vary as well. Specifically, the teeth may be arranged as straight splines or involute splines. For example, the splines may have various major diameters, minor diameters, pitch diameters and the like. The instant invention can be made with various thread sizes, barrel lengths, flange diameters, and spline configurations.

The fastener includes tapped threads on the internal surface of the bore through the fastener for mating engagement with a threaded member. Threads may be any size and fit and may be imperial or metric internal threads.

The fastener may be manufactured in steel, stainless steel, other ferrous materials and non-ferrous materials. The body of the fastener is formed in a cold-heading process and then the body is internally tapped. An optional locking mechanism, either a nylon or spring steel ring, is then inserted into a counterbore on the flange end and material is crimped to contain the ring. A mechanical crimp may be applied to distort the internal threads and create a locking feature.

The prior art 4 point (4-tooth nut) style fastener creates high stress points in dense materials where the fastener of the present invention creates lower stress points because the displacement of material is less and because the displacement of material does not extend as far radially outwardly from the barrel.

Because the prior art 4-tooth fastener displaces considerable material, problems become evident in thinner substrates and will often create an undesirable and unattractive square-shaped protrusion in the material. The fastener of the instant invention does not create a shape transfer of any kind and allows for an aesthetically pleasing appearance.

Accordingly, it is an object of the present invention to provide an automation nut which has a high resistance to spin out torque and which does not cause deformation in the surface characteristics of a substrate into which it is inserted.

Accordingly, it is an object of the present invention to provide a fastener for use with a substrate which enables smooth and complete riveting of the fastener to the substrate.

Accordingly, it is an object of the present invention to provide a fastener for use with a substrate which includes a gripping portion having 12 teeth for gripping the bore and surrounding material to provide improved spin out torque resistance and which does not unduly deform the substrate into which it is inserted.

A better understanding of the invention will be had when reference is made to the Brief Description Of The Drawing, Description Of the Invention and Claims which follow hereinbelow.

BRIEF DESCRIPTION OF THE DRAWINGS

FIG. 1B is a side view of the prior art automation nut.

FIG. 1C is an end view of the prior art automation nut.

FIG. 1D is a perspective view of the prior art automation nut illustrating the sharp squared teeth of the nut.

FIG. 2A is a cross-sectional view taken along the lines 2A-2A of FIG. 2 illustrating minimal distortion of a plastic substrate into which the splined automation nut has been forced.

FIG. 2B is a front side view of the splined automation nut illustrated in FIGS. 2 and 2A.

FIG. 2C is an end view of the splined automation nut illustrated in FIGS. 2, 2A and 2B.

The drawings will be better understood when reference is made to the Description of the Invention and the Claims which follow hereinbelow.

DESCRIPTION OF THE INVENTION

Figure 1:
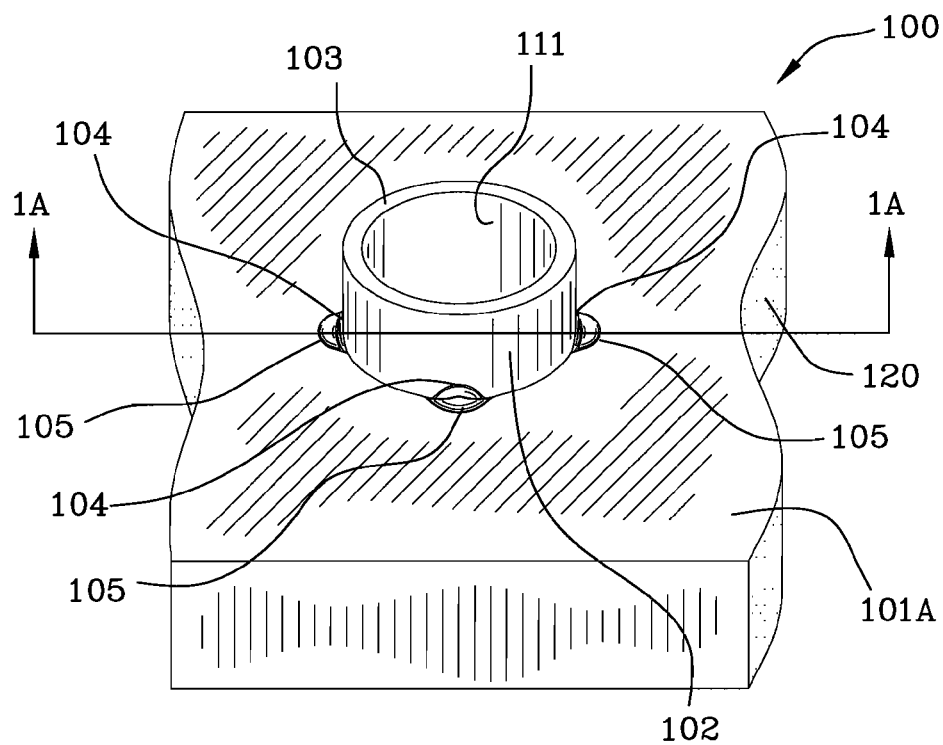
FIG. 1 is a perspective view of the prior art 4-tooth automation nut inserted into a substrate.
Figure 1A:
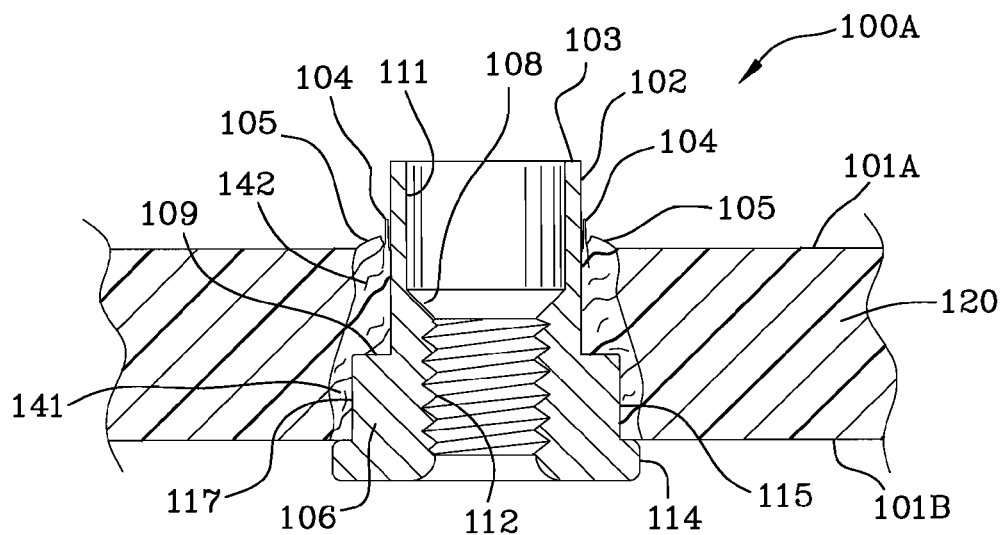
FIG. 1A is a cross-sectional view taken along the line 1A-1A of FIG. 1 illustrating the prior art automation nut inserted into a plastic substrate.
Figure 1E:
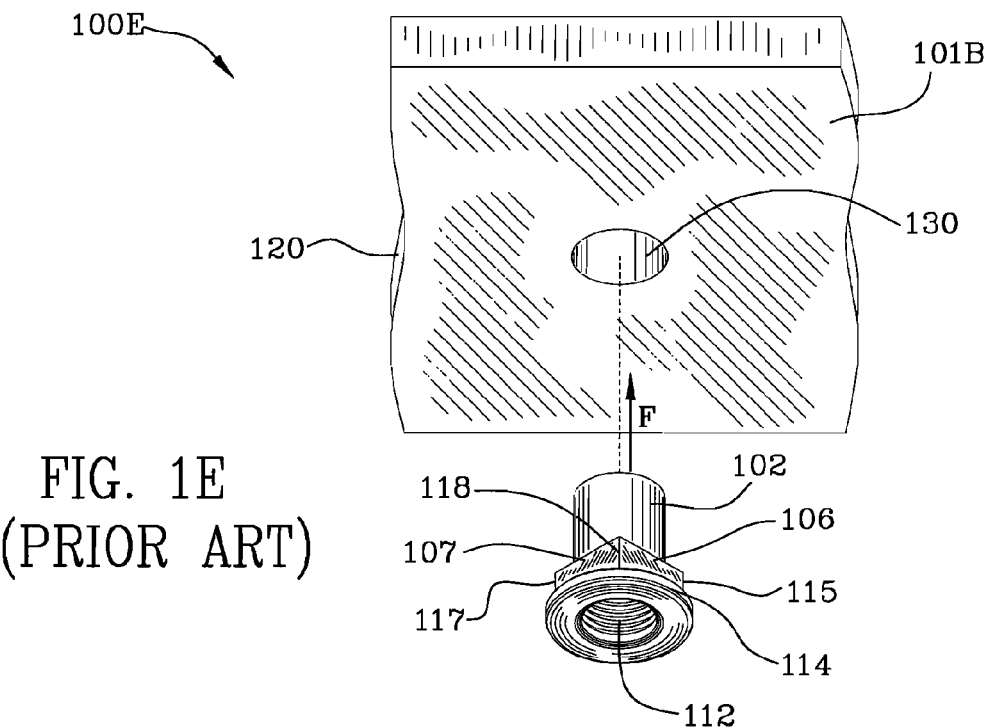
FIG. 1E is a perspective view of the prior art automation nut shown positioned for insertion into a substrate.
Figure 1F:
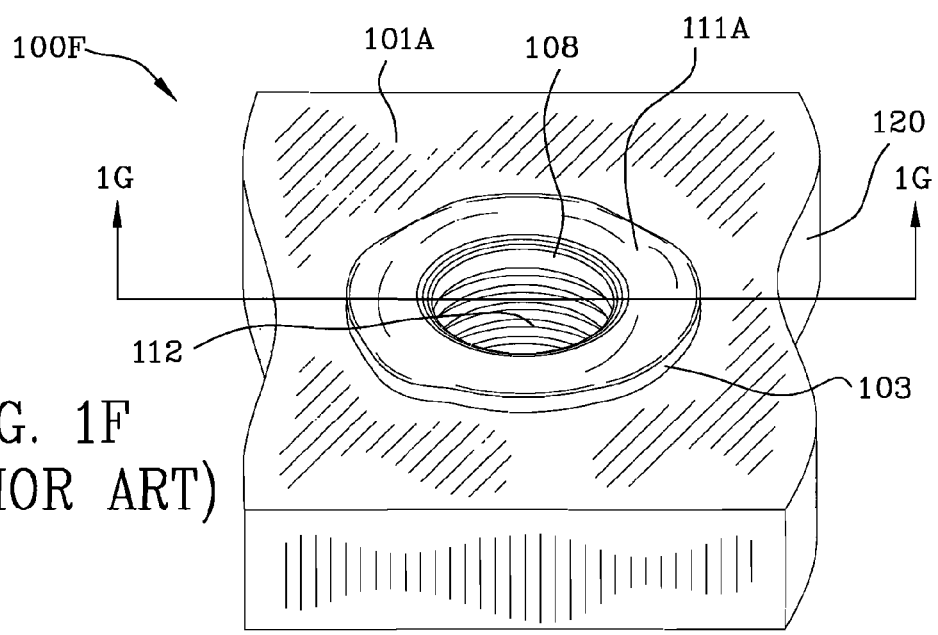
FIG. 1F is an enlarged view of the prior art automation nut similar to FIG. 1 with the barrel flared and secured to the plastic substrate.
Figure 1G:
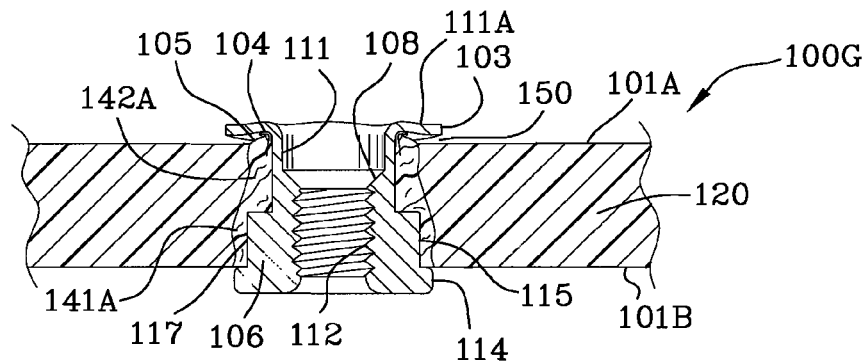
FIG. 1G is a cross-sectional view taken along the lines 1G-1G of FIG. 1F.
Figure 1H:
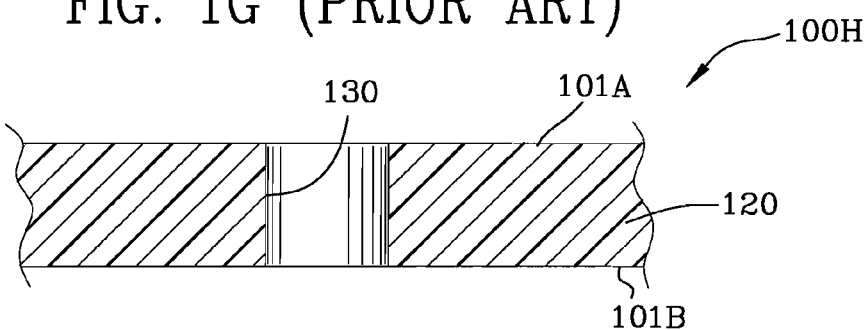
FIG. 1H is a cross-sectional view of the bore through the plastic substrate prior to insertion of the prior art automation nut therein.
Figure 1I:
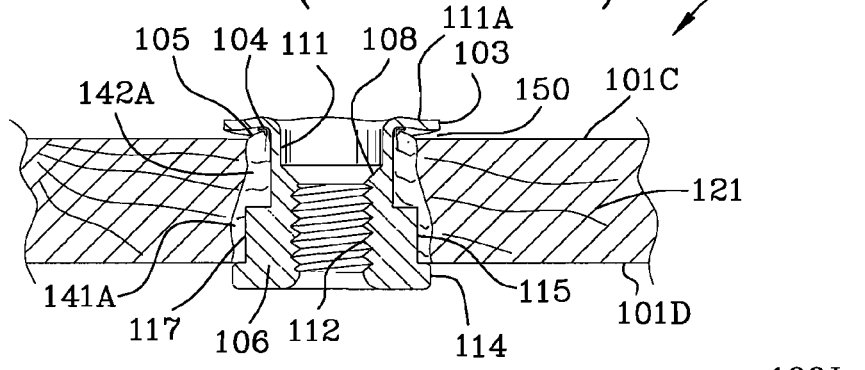
FIG. 1I is a cross-sectional view similar to FIG. 1G illustrating a barrel flared over deformed portions of a wooden substrate.
Figure 1J:
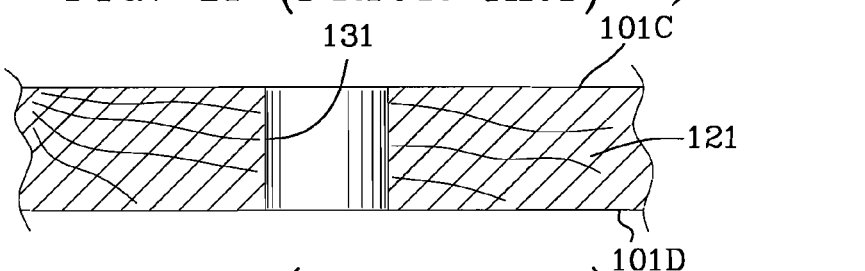
FIG. 1J is a cross-sectional view of the bore through the wooden substrate prior to insertion of the prior art automation nut therein.
Figure 1K:
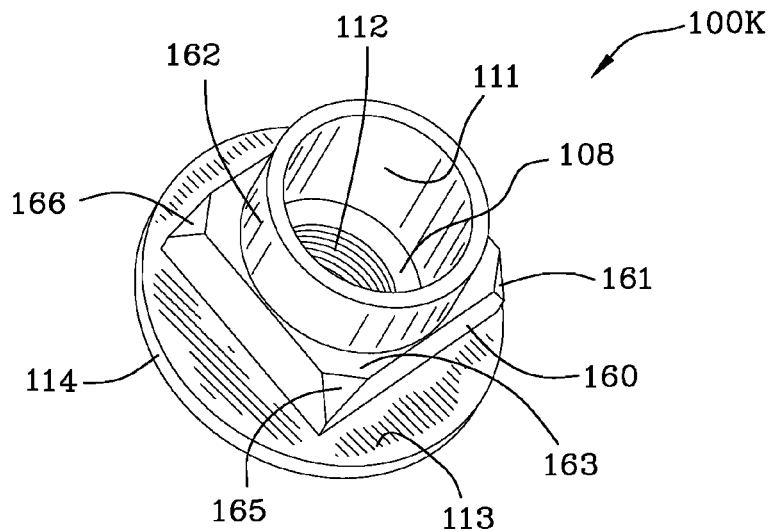
FIG. 1K is a perspective view of the prior art automation nut.

FIGS. 1 through 1K have been described above in the Background of the Invention.

Figure 2:
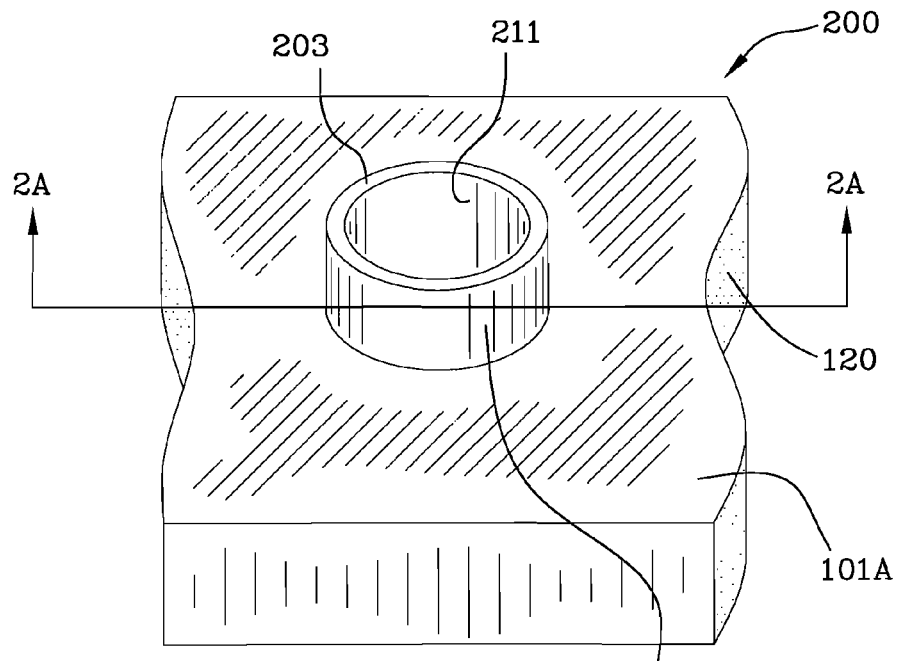
FIG. 2 is a perspective view of a splined automation nut having a gripping portion with 12 teeth which is an example of the instant invention.

FIG. 2 is a perspective view 200 of an example of the invention. FIG. 2 illustrates a splined automation nut having an outer gripping portion 206 with 12 teeth. FIG. 2 illustrates the splined automation nut, and particular the barrel of the splined automation nut 202, as protruding through the plastic substrate 120 and its surface 101A. Counterbore 211 and end 203 of the barrel 202 are illustrated in FIG. 2. No splintering, shards or protrusions exist when the splined automation nut with 12 teeth on its gripping section is used. The counter bore is typically 0.25 inches long.

The substrate may be plastic, wood, hard or soft plywood or pressboard. Nominally, the substrate thickness is in the range of 0.1875 to 1.00 inch. However, any size substrate may be used.

FIG. 2A is a cross-sectional view 200A taken along the lines 2A-2A of FIG. 2 illustrating minimal distortion 242 of the plastic substrate 120 into which the splined automation nut has been forced. The distance between teeth 215 and 217 as represented by reference numeral 299 of the gripping portion 206 is nominally 0.42 inches and is larger than the diameter of the bore 130 (which is nominally 0.375 inches in diameter) into which it is inserted. See, FIG. 3, a cross-sectional view 300 of the bore 130 through the plastic substrate 120 prior to insertion of the splined automation nut therein. No distortion is indicated near the upper surface 101A and minimal distortion 242 is indicated above teeth 215 and 217. Flange 214 abuts the lower surface 101B.

Still referring to FIGS. 2B and 2C in particular, the overall height of the fastener is 0.625 inches, the barrel has a diameter which is nominally 0.371 inches and the height of the gripping portion 206 is nominally 0.17 inches. The flange height is 0.08 inches.

Figure 2D:
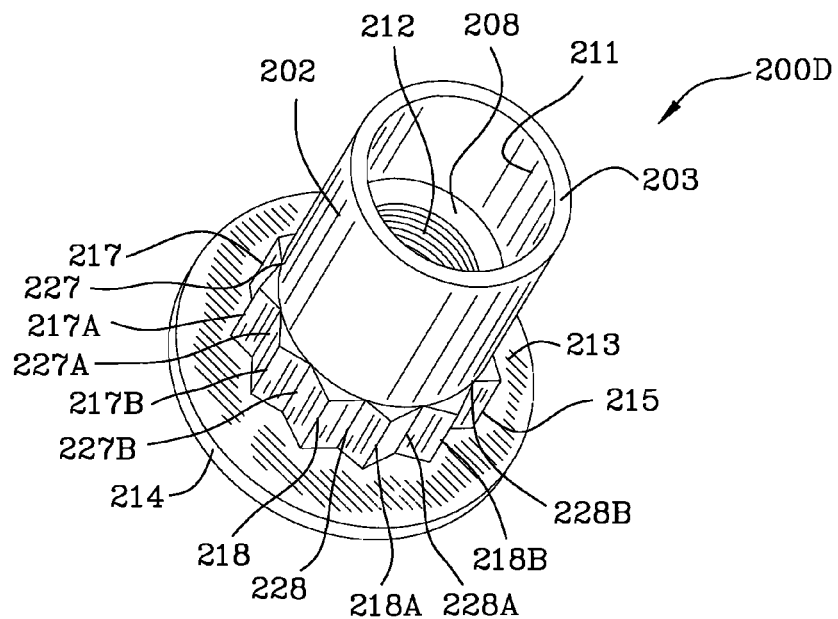
FIG. 2D is a perspective view of the splined automation nut in FIG. 2-2C.

FIG. 2B is a front side view 200B of the example of the splined automation nut illustrated in FIGS. 2 and 2A. FIG. 2C is an end view 200C of the splined automation nut. FIGS. 2B and 2C illustrate 12 teeth, namely, 215-215B, 216-216B, 217-217B, and 218-218B. Recesses between the teeth, namely, 225-225B, 226-226B, 227-227B, 228-228B are also illustrated in FIGS. 2B and 2C. FIG. 2D is a perspective view 200D of the splined automation nut. It will be noticed from these illustrations that the teeth may assume a shallow pitch. However, it is specifically contemplated that different pitches may be used and that different configurations of the splined teeth may be used. For instance, straight or involute splines may be used. The instant invention can be made with various thread sizes, barrel lengths, flange diameters, and spline configurations. In short, it is specifically contemplated that various other geometrical shapes of the teeth may be used.

There are several advantages of the automation nut employing a gripping portion having 12 teeth. First, when the gripping portion with the configuration disclosed herein is forcefully inserted in a substrate, deformation of the plastic and wood does not occur such that the automation nut may be securely riveted to the substrate by deforming the barrel. Second, preliminary testing indicates that the 12-tooth automation nut has improved spin-out properties as compared to the prior art nut having 4 teeth. In other words, the 12 teeth work to secure the fastener to the substrate securely such that a mating stud when locked to the nut will not rotate the fastener within the substrate.

Each tooth of the gripping portion of the prior art automation nut illustrated in FIG. 1-1K extends approximately 0.076 inches radially outwardly from the outside surface of the barrel 111. Each tooth of the gripping portion of the example of the automation nut set forth in FIGS. 2-2D extends radially outwardly 0.025 inches. Use of the nut having a gripping portion with 12 teeth has been found to prevent deformation of the substrates and to improve the spin-out properties of the fastener.

Figure 2E:
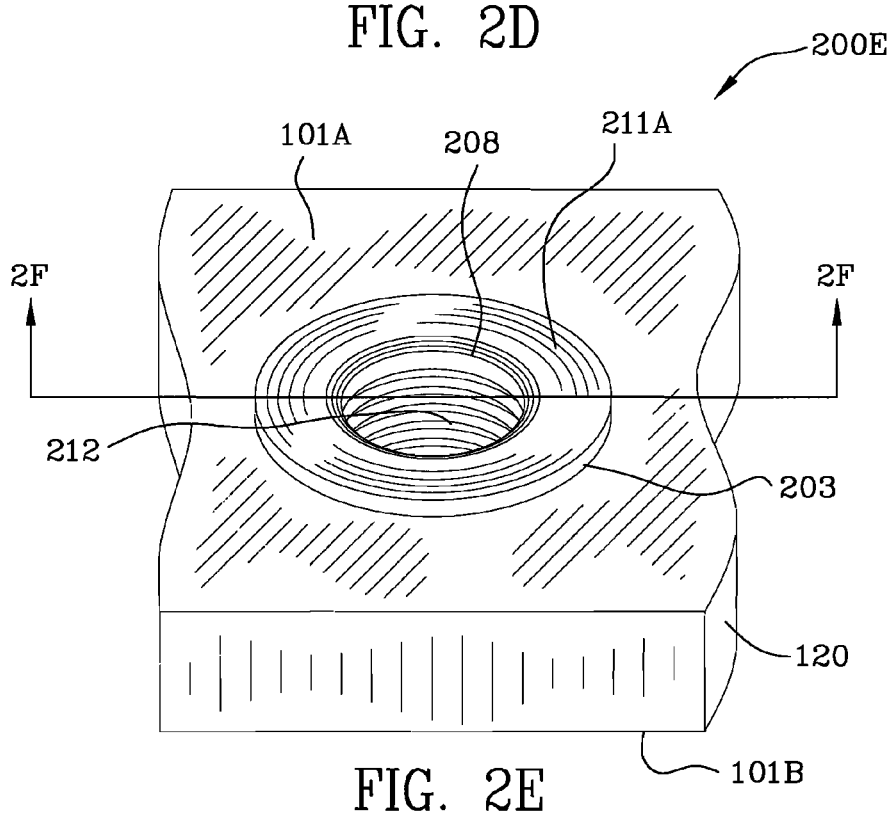
FIG. 2E is a perspective view of the splined automation nut in FIG. 2-2D.

FIG. 2E is a perspective view 200E of the splined automation nut illustrating that the riveted barrel 211 lays flat against the surface 101A of the substrate 120. Flange 214 of the splined automation nut engages surface 101B when the device is forcefully shoved into the bore 130.

Figure 2F:
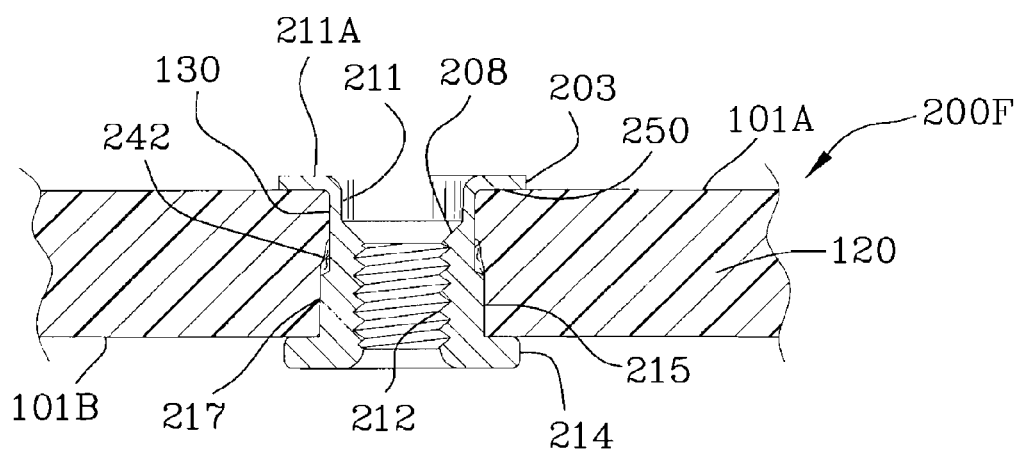
FIG. 2F is a cross-sectional view taken along the lines 2F-2F of FIG. 2E illustrating the splined automation nut with its barrel flared over the plastic substrate.

FIG. 2F is a cross-sectional view 200F taken along the lines 2F-2F of FIG. 2E illustrating the splined automation nut with its barrel smoothly flared/riveted over the plastic substrate 120 without any shards or protrusions interfering with the riveting of the barrel. Flange 214 of the splined automation nut engages surface 101B when the device is forcefully shoved into the bore 130. Reference numeral 242 indicates a small deformation above the respective teeth 215, 217 and it can be seen that the distance between teeth 215 and 217 is relatively close to the diameter of the bore 130. The deformation caused by teeth 215, 216, 217 and 218 is relatively insignificant and does not cause any discoloration and does not cause any interference with flaring/riveting the barrel 211 such that a smooth and uniform lip 211A is formed over the substrate 211. In other words, the splined automation nut having a gripping portion with 12 teeth does not cause the deformation with the surface 101A of the substrate. Reference numeral 250 indicates that the lip 211A rests over the surface 101A without a gap therebetween.

Figure 2G:
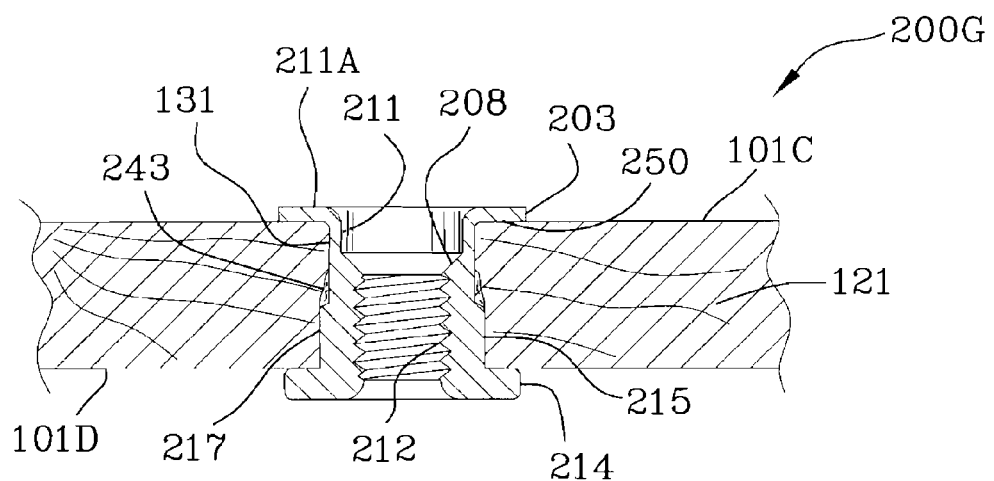
FIG. 2G is a cross-sectional view of the splined automation nut of FIGS. 2-2D with its barrel flared over the wooden substrate.

FIG. 2G is a cross-sectional view 200G of the splined automation nut with the barrel smoothly flared over the wooden substrate. Flange 214 of the spline automation nut engages surface 101D when the device is forcefully shoved into the bore 131. Deformation 243 of the wood above the teeth 215, 216, 217 and 218 can be seen in FIG. 2G and the deformation does not interfere with the smooth riveting of the lip 211A over the wood surface 101C. Reference numeral 250 indicates that lip 211A fits smoothly over the surface 101C of the wood and that no gap between the lip 211A and the surface 101C exists.

Figure 2H:
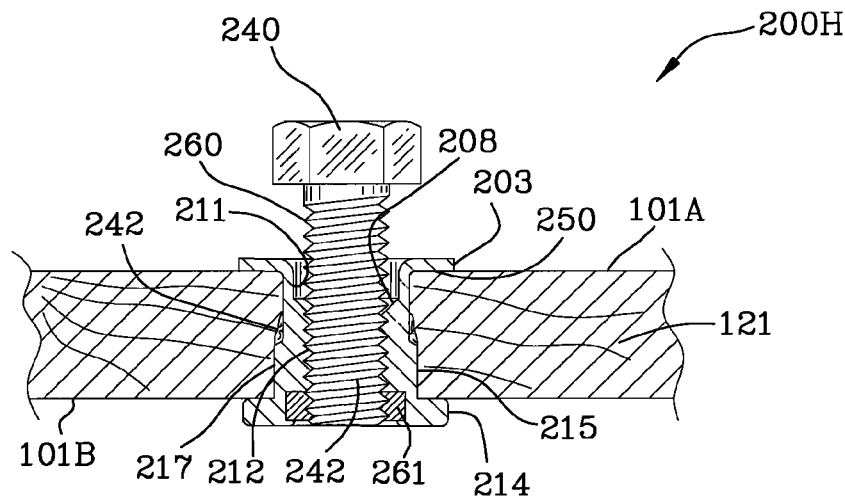
FIG. 2H is a cross-sectional view similar to FIG. 2G with a threaded stud interengaging the splined automation nut.

FIG. 2H is a cross-sectional view 200H similar to FIG. 2G with a threaded stud 260 interengaging the splined automation nut. Additionally, a nylon locking ring 261 resides within the nut for securing the stud in place. The splined automation nut using a 12-tooth gripping portion has improved spin-out properties. In other words a higher torque is required to rotate the 12-tooth automation nut with a stud locked thereto as compared to the 4-tooth automation nut.

Figure 3:
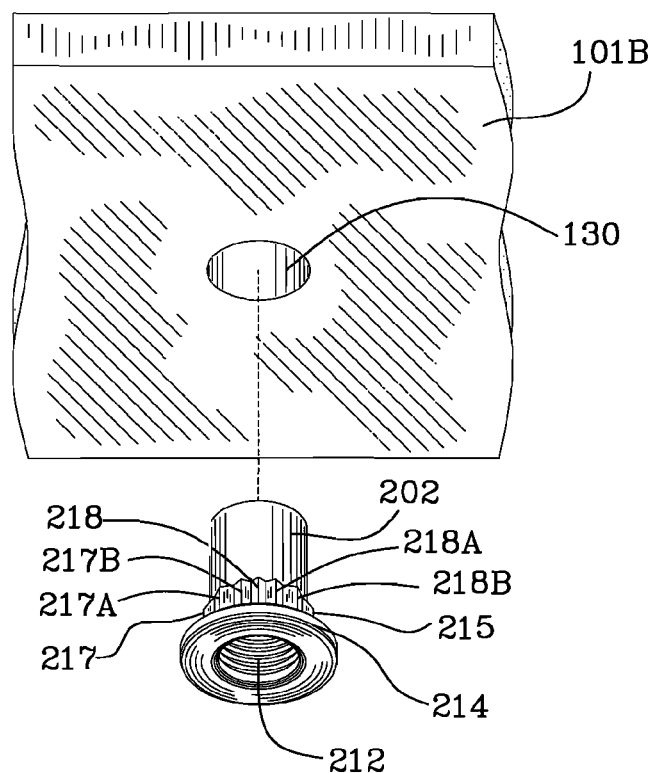
FIG. 3 is an exploded assembly view of the bore through the plastic substrate prior to insertion of the splined automation nut therein.

FIG. 3 is an exploded assembly view 300 of the bore 130 through the plastic substrate 120 prior to insertion of the splined automation nut therein.

Figure 4A:
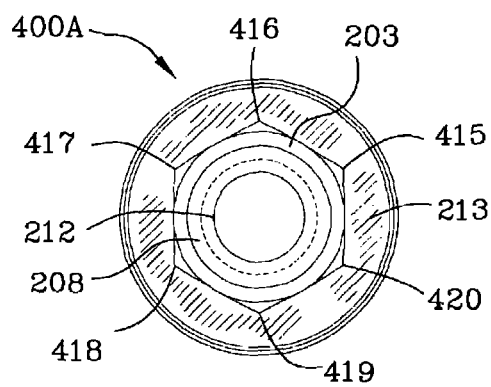
FIG. 4A is an end view of FIG. 4.
Figure 4:
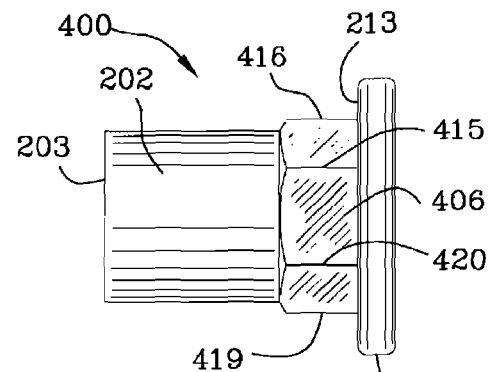
FIG. 4 is a front side view illustration of another example of a splined automation nut with a gripping portion having 6 teeth.

FIG. 4 is a front side view 400 illustration of a splined automation nut having 6 teeth arranged symmetrically about its gripping portion 406. FIG. 4A is an end view 400A of FIG. 4. The point to point distance of the 6-tooth arrangement measured between diametrically situated teeth is the same as the point to point distance of the 12-tooth arrangement, namely 0.42 inches. This distance is greater than the diameter of the bore of the substrate 120, 121.

Figure 5A:
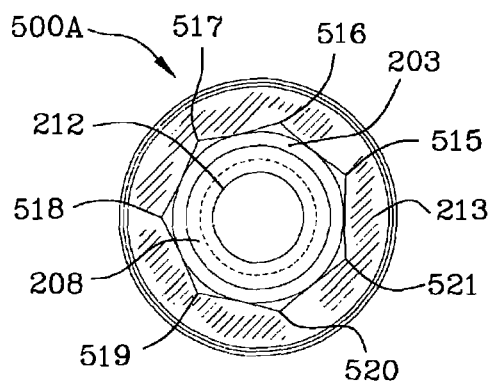
FIG. 5A is an end view of FIG. 5.
Figure 5:
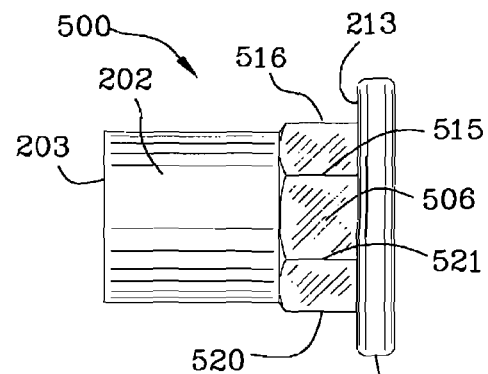
FIG. 5 is a front side view illustration of another example of a splined automation nut with a gripping portion having 7 teeth.

FIG. 5 is a front side view 500 illustration of a splined automation nut having 7 teeth. FIG. 5A is an end view 500A of FIG. 5. The bore in the substrate is slightly larger in diameter than the barrel. The bore being smaller in diameter than the largest diametrical measurement of the gripping portion. The largest diametrical measurement is measured from the apex of one tooth to the apex of a tooth diametrically situated or if no tooth is diametrically situated as illustrated in FIG. 5, then to the next adjacent tooth nearest a point diametrically related to the reference tooth. For instance, the largest measurement in FIG. 5A is obtained between points, i.e., reference tooth 518 and teeth 515 or 521 being nearest to the point diametrically opposite reference tooth 518. By diametrically opposite it is meant through the center of the barrel. This distance, 0.42 inches, is greater than the diameter of the bore of the substrate 120, 121.

Figure 6A:
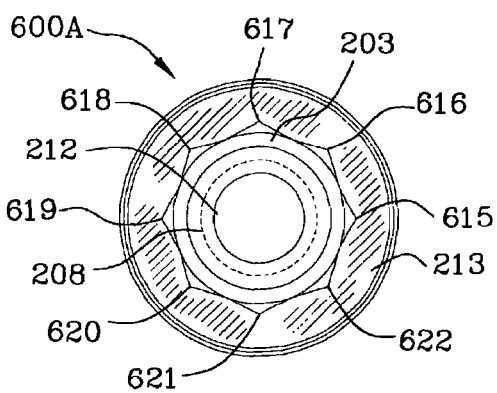
FIG. 6A is an end view of FIG. 6.
Figure 6:
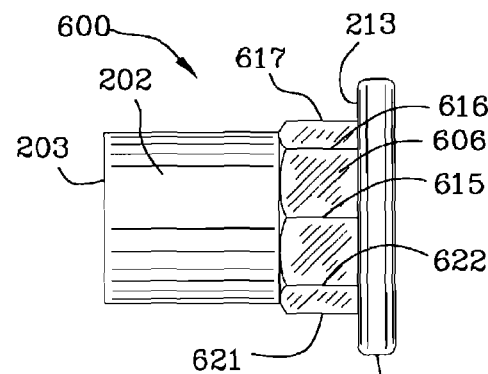
FIG. 6 is a front side illustration of another example of a splined automation nut with a gripping portion having 8 teeth.

FIG. 6 is a front side illustration 600 of a splined automation nut having 8 teeth. FIG. 6A is an end view 600A of FIG. 6. The point to point distance of the 8-tooth arrangement is measured from the apex of one tooth to the apex of a tooth diametrically situated. For instance from tooth 619 to tooth 615. This distance, 0.42 inches, is greater than the diameter of the bore of the substrate 120, 121.

Figure 7A:
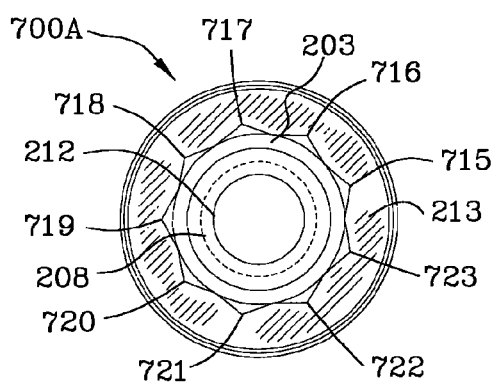
FIG. 7A is an end view of FIG. 7.
Figure 7:
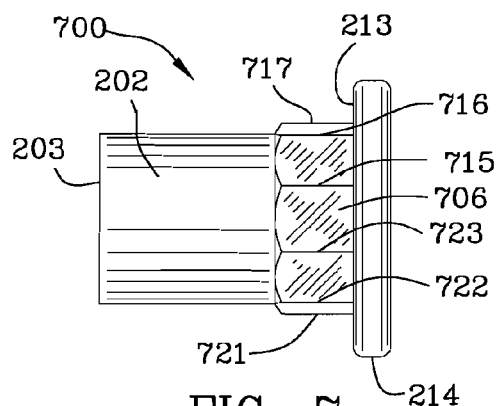
FIG. 7 is a front side illustration of another example of a splined automation nut with a gripping portion having 9 teeth.

FIG. 7 is a front side illustration 700 of a splined automation nut having 9 teeth. FIG. 7A is an end view 700A of FIG. 7. The largest diametrical measurement is measured from the apex of one tooth to the apex of a tooth diametrically situated or if no tooth is diametrically situated as illustrated in FIG. 7 then to the adjacent tooth. For instance, the largest measurement in FIG. 7A is obtained between points 719 (reference tooth) and 715 or 723 being nearest to the point diametrically opposite tooth 719. By diametrically opposite it is meant through the center of the barrel. This distance, 0.42 inches, is greater than the diameter of the bore of the substrate 120, 121.

Figure 8A:
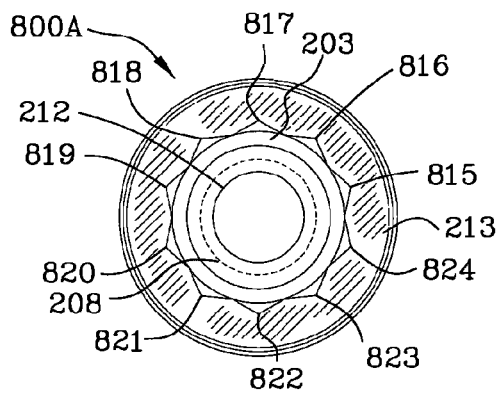
FIG. 8A is an end view of FIG. 8.
Figure 8:
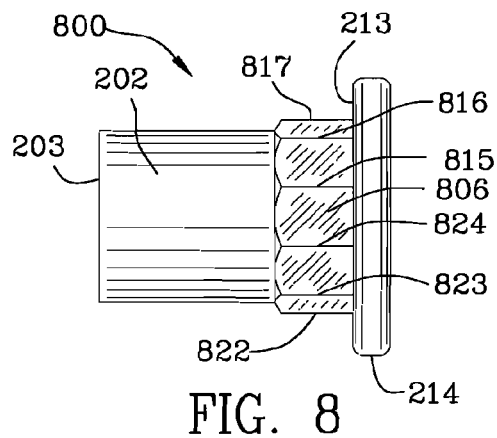
FIG. 8 is a front side illustration of another example of a splined automation nut with a gripping portion having 10 teeth.

FIG. 8 is a front side illustration 800 of a splined automation nut having 10 teeth. FIG. 8A is an end view 800 of FIG. 8. The point to point distance of the 10-tooth arrangement is measured from the apex of one tooth to the apex of a tooth diametrically situated. For instance, the distance between the apex of tooth 819 and tooth 824. This distance, 0.42 inches, is greater than the diameter of the bore of the substrate 120, 121.

Figure 9A:
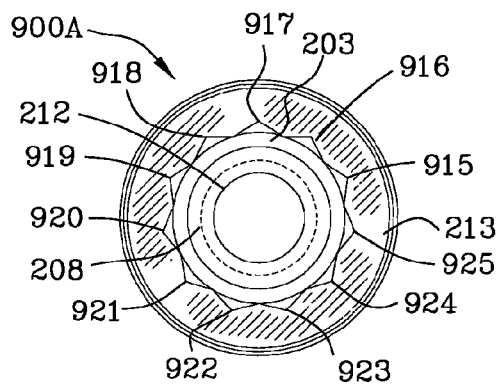
FIG. 9A is an end view of FIG. 9.
Figure 9:
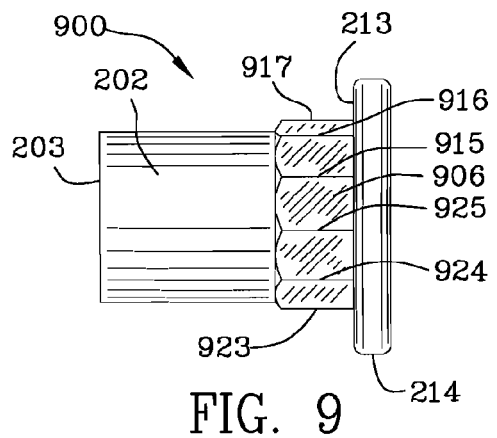
FIG. 9 is a front side illustration of another example of a splined automation nut with a gripping portion having 11 teeth.

FIG. 9 is a front side illustration 900 of a splined automation nut having 11 teeth. FIG. 9A is an end view 900A of FIG. 9. The largest diametrical measurement is measured from the apex of one tooth to the apex of a tooth diametrically situated or if no tooth is diametrically situated as illustrated in FIG. 9 then to the adjacent tooth of a point diametrically opposite the reference tooth. For instance, the largest measurement in FIG. 9A is obtained between points 920 (reference tooth) and teeth 915 or 925. By diametrically opposite it is meant through the center of the barrel. This distance, 0.42 inches, is greater than the diameter of the bore of the substrate 120, 121.

LIST OF REFERENCE NUMERALS

100-100K—view of prior art
101A, 101B—surface of substrate
102—barrel of prior art fastener
103—end of prior art fastener
104—shard of plastic
105—discoloration and deformation
106—outer gripping portion having teeth
108—shoulder
109—upper surface of gripping portion
111—counterbore
111A—flared/riveted counterbore forming a lip
112—internal threads in bore
113—surface of flange
114—flange
115-118—tooth (point) on 4-sided nut
120—plastic substrate
121—wooden substrate
130, 131—bore
141, 142—deformed plastic
141A, 142A—deformed wood
150—gap
160—gripping portion
163—surface of gripping portion
161, 165, 166—beveled tooth
200-200H—view of one example
202—barrel
203—end of barrel
206, 406, 506, 606, 706, 806, 906—outer gripping portion having teeth
208—shoulder
211—counterbore
211A—flared/riveted counterbore forming a lip
212—internal threads
213—mating surface of the flange
215A-C, 216A-C, 217A-C, 218A-C—teeth
225A-C, 226A-C, 227A-C, 228A-C—recess
242, 243—minor deformation
250—flared end in contact with substrate
260—threaded stud
261—locking ring
299—dimension between outer point of teeth 215 and 217

300—assembly view with substrate
400, 400A, 500, 500A, 600, 600A, 700, 700A, 800, 800A, 900, 900A—views of other examples of the automation nut
415-420, 515-521, 615-622, 715-723, 815-824, 815-824, 915-924—teeth Those skilled in the art will readily recognize that the invention has been set forth by way of example only and that changes may be made to the examples given without departing from the spirit and the scope of the appended claims.

The invention claimed is:

1. A process for forming a fastener secured to a substrate, comprising the steps of:
    cold heading a barrel shaped fastener creating a flange and a gripping portion including splined teeth, said gripping portion includes at least 6 splined teeth arranged symmetrically around the circumference of said barrel and proximate said flange;
    boring a hole in said substrate, said bore being slightly larger in diameter than said barrel, said bore being smaller in diameter than the largest diametrical measurement of said gripping portion, said largest diametrical measurement taken from the apex of one of said splined teeth to the apex of a splined tooth diametrically situated or if no splined tooth is located diametrically then to the apex of the adjacent splined tooth;
    forcing said barrel shaped fastener into said substrate until said flange engages said substrate and said splined teeth engage said substrate;
    riveting said barrel into engagement with said substrate.

2. A process as claimed in claim 1 wherein said substrate is plastic.

3. A process as claimed in claim 1 wherein said substrate is wood.

* * * * *

UNITED STATES PATENT AND TRADEMARK OFFICE
CERTIFICATE OF CORRECTION

PATENT NO. : 8,672,597 B2  
APPLICATION NO. : 11/673525  
DATED : March 18, 2014  
INVENTOR(S) : Stephen Selle and Jonathan Wayne Dieter Page 1 of 1

It is certified that error appears in the above-identified patent and that said Letters Patent is hereby corrected as shown below:

In the Specification

US Patent No. 8,672,597 B2, Col. 2, line 46, after "view" delete "1001" and insert --100I-- therefor.

Signed and Sealed this  
Third Day of June, 2014

Michelle K. Lee  
*Deputy Director of the United States Patent and Trademark Office*